United States Patent [19]

Faggin et al.

[11] Patent Number: 4,524,244
[45] Date of Patent: Jun. 18, 1985

[54] DIGITAL AND VOICE TELECOMMUNICATION APPARATUS

[75] Inventors: Federico Faggin, Los Altos Hills; Jerry A. Klein, Los Altos; Lauren F. Yazolino, Oakland; Robert G. Korody; Eric P. L. Ha, both of Cupertino, all of Calif.; Stephen Kerman, Southbury, Conn.

[73] Assignee: Cygnet Technologies, Inc., Sunnyvale, Calif.

[21] Appl. No.: 520,739

[22] Filed: Aug. 5, 1983

[51] Int. Cl.³ ............................................ H04M 11/00
[52] U.S. Cl. ................................................. 179/2 DP
[58] Field of Search ................ 179/2 A, 2 AM, 2 C, 179/2 DP; 375/8

[56] References Cited

U.S. PATENT DOCUMENTS 4,009,342  2/1977  Fahrenschon et al. .......... 179/2 DP
4,350,848  9/1982  Kariya et al. .................... 179/2 DP
4,488,002 12/1984  Seibel .............................. 179/2 DP

FOREIGN PATENT DOCUMENTS 57-4649  1/1982  Japan .............................. 179/2 DP

OTHER PUBLICATIONS

BIZCOMP, Brochure: "There's Only One PC/XT Modem Designed to Let Both You and Your Computer Talk on the Same Line", modem introduced in 1983.
Chrisfield et al., "Time Sharing Circuit for Voice and FSK Data", IBM Technical Bulletin, vol. 17, No. 2, pp. 477-478, Jul. 1974.

Witiak et al., "Online Database Searching Via Telephone Conferencing", Online, Apr. 1979, pp. 21-23.

Primary Examiner—Keith E. George
Attorney, Agent, or Firm—Limbach, Limbach & Sutton

[57] ABSTRACT

The present invention relates to a communication apparatus for transmitting and receiving analog voice and digital data signals to and from a telephone line or telephone lines to one or more users, in the same session. The apparatus has a telephony apparatus for transmitting or receiving the voice signals and a modem for transmitting or receiving the data signal. A switch is interposed between the telephone line and the modem and the telephony apparatus. The switch can be placed in a first position or in a second position. In the first position, the telephone apparatus is connected to the telephone lines and transmits and receives voice signals. In addition, the modem is connected to receive data carrier signals that precede digital data signals and follow the digital data signals to and from the medium. A control circuit comprising a microprocessor, controls the switch such that it can be switched automatically between the first position and the second position. The microprocessor changes the switch from the first position to the second position when the apparatus transmits digital data signals or receives the carrier signal indicating that digital data signals will be received by the apparatus. Upon termination of the transmission of the digital data signals from the apparatus or upon termination of the reception of digital data signals, the microprocessor automatically switches the switch back to the first position whereby voice communication can be continued.

4 Claims, 15 Drawing Figures

Microfiche Appendix Included
(9 Microfiche, 550 Pages)

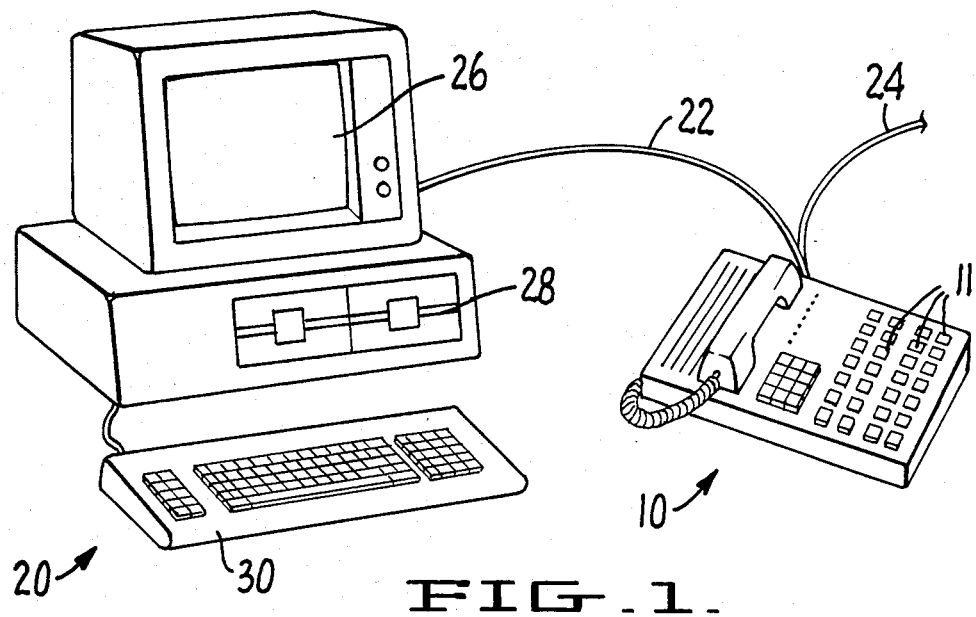
FIG. 1.
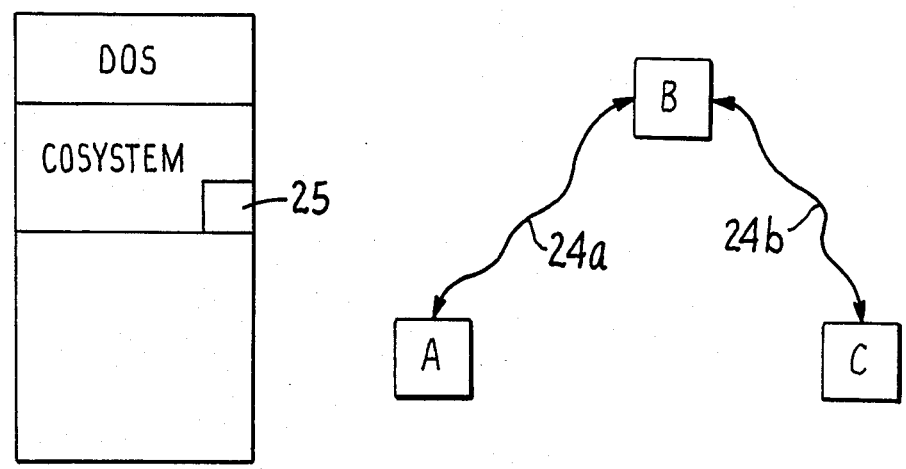
FIG. 4.
FIG. 5.
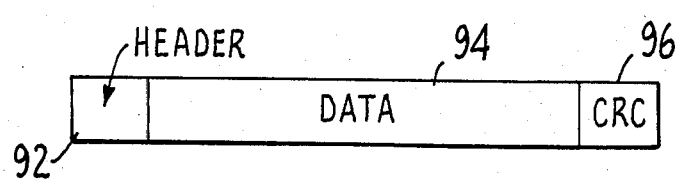
FIG. 6.

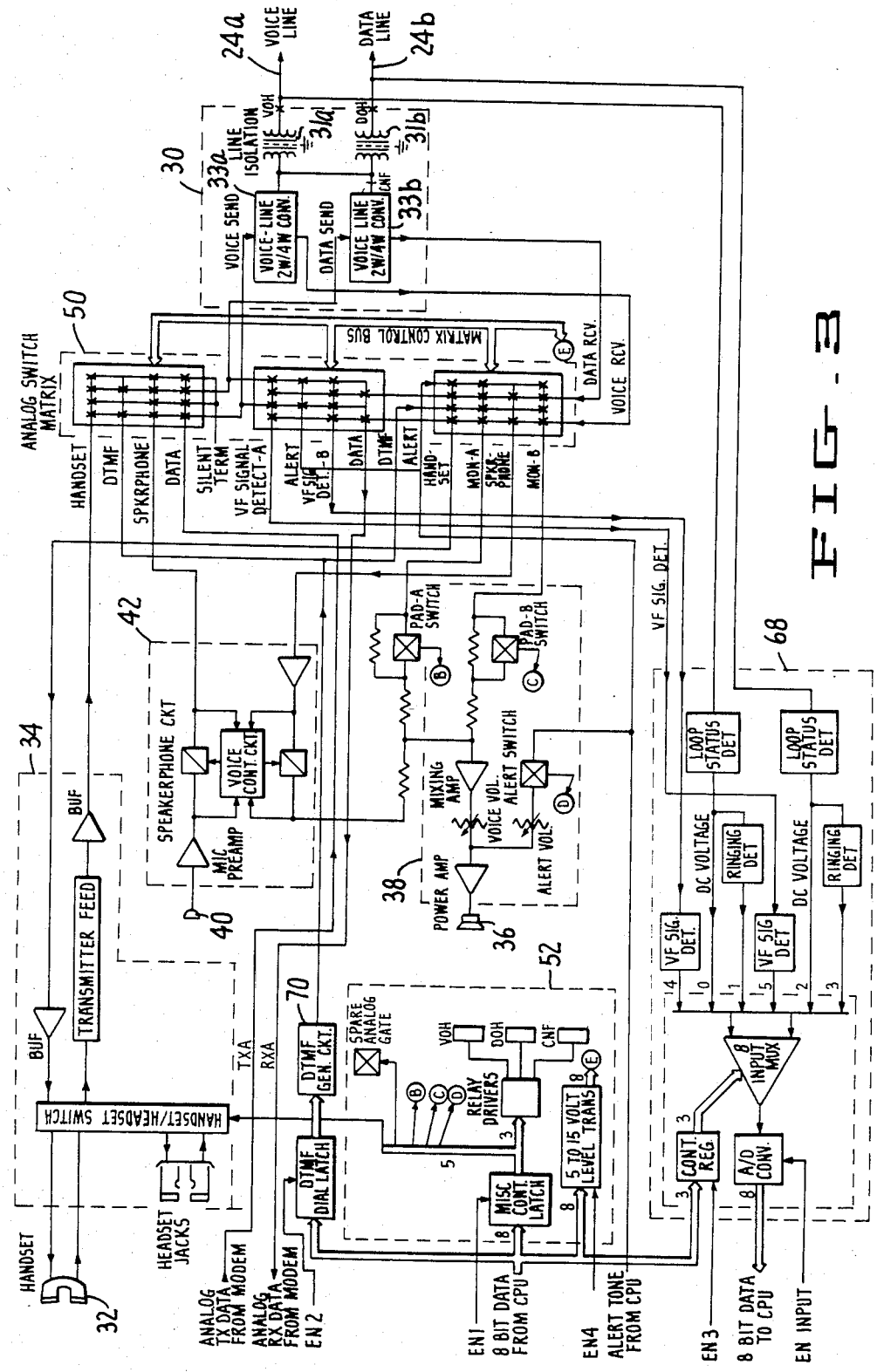

DIGITAL AND VOICE TELECOMMUNICATION APPARATUS

DESCRIPTION

This application includes two microfiche exhibits. Exhibit 1 contains five (5) fiches with a total of three hundred fifteen (315) frames. Exhibit 2 contains four (4) fiches with a total of two hundred thirty-five (235) frames.

TECHNICAL FIELD

The present invention relates to a communication apparatus for transmitting and receiving analog voice and data signals to and from a communication medium in the same session. More particularly, the present invention relates to a telephonic apparatus which also serves as an interface between a computer and a communication medium for transmitting and receiving analog voice and data signals in the same session.

BACKGROUND OF THE INVENTION

Telephonic apparatuses to transmit and receive analog voice signals to and from a communication medium are well known. The transmission and reception of digital data signals to and from a communication medium has typically been accomplished by the use of a modem. A modem is a device which modulates the digital signal, i.e., converts the digital signal to an analog signal for transmission along the communication medium and demodulates or converts the analog signal received from the communication medium into a digital signal. The modem, in turn, is interfaced to a computer or other source of digital data. Various patents disclose or teach the use of a modem with a computer to transmit and to receive digital data signals to and from a communication medium. See, for example, U.S. Pat. Nos. 3,825,905; 4,040,014; 4,085,449 and 4,232,293.

U.S. Pat. No. 4,378,470 discloses an interface circuit for connection to non-dedicated telephone lines for a telephonic apparatus and a modem.

However, none of the prior art references discloses or teaches an apparatus in which the analog voice and digital data signals can be transmitted to and received from a communication medium in the same session. A session is a time period commencing when an originating party has placed a call to an answering party or parties, communicates with that party, and then terminates the call.

In the prior art, devices to detect various status tones or supervisory tones are known. Status tones are tones such as ringing tone, ring back tone, dial tone, busy tone, etc. Typically, these tones have been discriminated from one another on the basis of presence and duration of energy. For example, if the amount of energy present exceeds two seconds in duration, then it's probably a dial tone. A burst of energy not exceeding one-half second is a busy tone. This discrimination is contextual and is based upon a fixed threshold. Further difficulty is that these tones are not always accurately held to a particular frequency.

There is also known in the prior art programmable electrical keys, i.e., switches whose functions can be set by a computer program. However, the problem of changing the labels of these programmed keys or of knowing what function has been programmed has not been addressed. To the extent that any labelling technique is known, it consists of simply affixing a tag or other designation to the associated key.

SUMMARY OF THE INVENTION

Therefore, in accordance with the present invention, there is provided a device which transmits and receives analog voice and digital data signals to and from a communication medium in a single session. The apparatus comprises telephonic means for transmitting and receiving voice signals to and from the medium and modem means for transmitting and receiving data signals to and from the medium. A switch means is interposed between the communication medium, the telephonic means and the modem means. The switch means is adapted to be set in a first position or in a second position. In the first position, the medium is connected to the telephonic means and the modem, such that the telephonic means can transmit and receive voice signals to and from the medium and the modem means can receive data signals from the medium. In the second position, the telephonic means is disconnected from the medium and the modem means is connected to transmit and to receive data signals to and from the medium. A control means controls the switch between the first and second positions. The control means automatically switches the switch means from the first position to the second position when the apparatus transmits data signals to the medium, or when the modem means detects data signals will be received from the medium. The control means also automatically switches the switch means from the second position to the first position when the apparatus terminates the transmission of the data signals to the medium, or when the modem means ceases to receive data signals from the medium.

In addition, in the present invention, transmission of data signals to the other like apparatus can be made while the other like apparatus is unattended. Thus, data messages can be transmitted and received by the other like apparatus even if the user is away or if the other like apparatus is in use.

BRIEF DESCRIPTION OF THE DRAWINGS

FIG. 1 is a perspective view of the apparatus of the present invention with a computer.

FIG. 3 is a block diagram of a portion of the diagram of FIG. 2, in greater detail.

FIG. 4 is a symbolic address map of the memory contents of the computer shown in FIG. 1.

FIG. 5 is a block diagram showing the apparatus of the present invention used in teleconferencing.

FIG. 6 is a block diagram of the protocol of the data stream transmitted and received with the apparatus of the present invention.

DETAILED DESCRIPTION OF THE DRAWINGS

Figure 2:
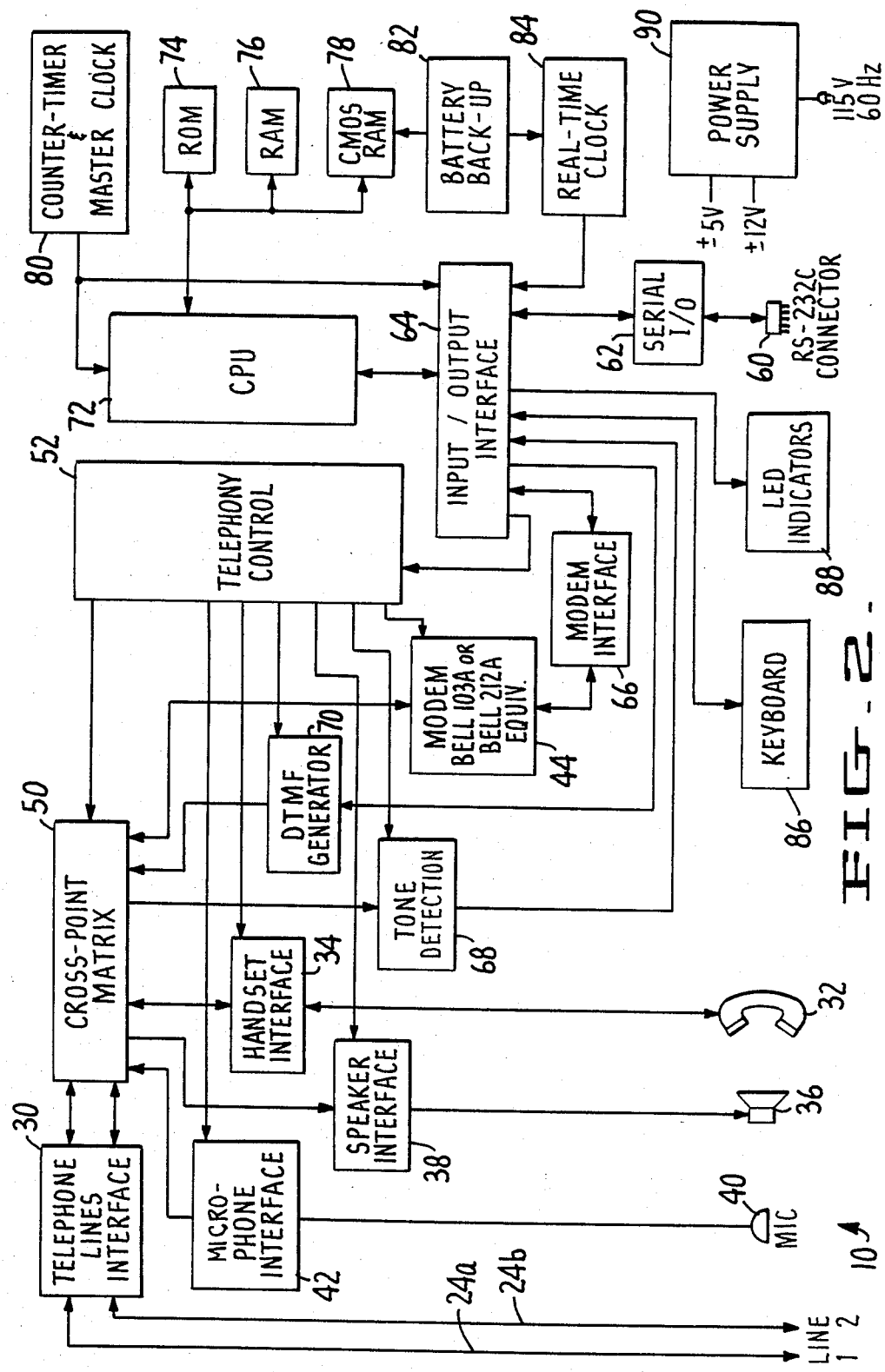
FIG. 2 is a block diagram of the apparatus of the present invention.

Referring to FIG. 1, there is shown an apparatus 10 of the present invention. The apparatus 10 is coupled to a computer system 20, via cables 22. The apparatus 10 is also coupled to telephone line 24 or lines 24a and 24b (as shown in FIG. 2).

The computer system 20 can be any type of computer. Preferably, the computer system 20 has a standard RS232C interface port. The cable 22 is connected between the RS232C port of the computer system 20 and with the apparatus 10. To the computer system 20, the apparatus 10 is treated as another peripheral device connected to the system 20. An example of a suitable computer system 20 is the IBM Personal Computer. The computer system 20 has a display screen 26, a mass storage device 28, such as a floppy disc, and a keyboard 30 for entry of input data. Memory and a microprocessor reside within the computer system 20.

The apparatus 10 receives digital data signals from the computer system 20 and provides digital data signals to the computer system 20. The apparatus 10 also communicates with the telephone line 24 and provides an analog signal to and from the telephone line 24.

Shown in greater detail in FIG. 2 is a block diagram of the apparatus 10 of the present invention. The apparatus 10 comprises telephone line interface 30 for interfacing with telephone lines 24a and 24b. Although the embodiment shown in FIG. 2 shows two telephone lines, 24a and 24b, to which the apparatus 10 of the present invention is attached, the apparatus 10 of the present invention can also be used with one telephone line 24. This will be discussed in greater detail hereinafter.

From the telephone line interface 30, the analog signals are supplied to a cross-point matrix 50, which will be discussed in greater detail hereinafter. A microphone 40 is connected through a microphone interface 42, to the cross-point matrix 50. A speaker 36 is connected through the speaker interface 38 to the cross-point matrix 50. A handset 32 is connected through the handset interface 34 to the cross-point matrix 50. The microphone 40, speaker 36 and the handset 32 provide analog voice signals to and from the apparatus 10; along with their respective interface units, these components are well known.

Figure 12:
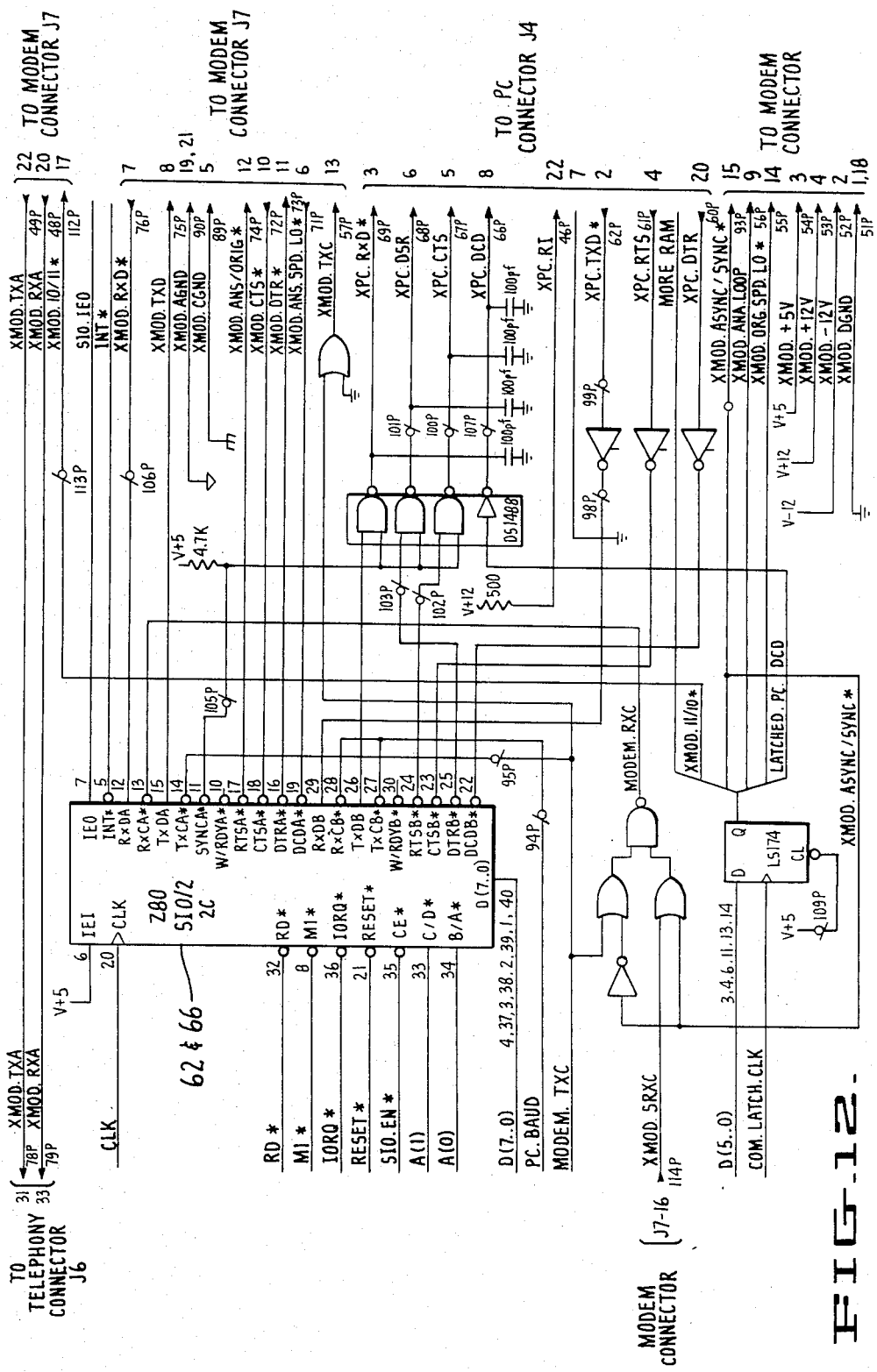

The digital data signals are supplied from the computer system 20 via cable 22 into the RS232C connector 60. The digital data signals are then passed through a serial input/output interface 62 and is supplied to an input/output interface 64. From the input/output interface 64, the digital data signals are passed through a modem interface 66, which can be another serial input/output interface. Thus, the input/output interface 62 and the modem interface 66 can be a 2 channel serial input/output chip, such as the Z80 SIO/2 manufactured by Zilog Corporation, among others (see FIG. 12). From the modem interface 66, the digital data signals are passed to a modem 44, which will be discussed in greater detail. The modem 44 supplies the data signals to the cross-point matrix 50. Signals from the telephone line 24a or 24b carrying digital information are passed in the reverse order as outlined hereinabove i.e., from the telephone line interface 30 through the cross-point matrix 50, through the modem 44, through the modem interface 66, etc.

A tone detection circuit 68 is also connected to the cross-point matrix 50 and supplies its output to the input/output interface 64. The DTMF (Dual Tone Multi-Frequency) generator 70, which generates the tones for Touch-Tone (a trademark of AT&T) operation, is under the control of the input/output interface 64. The DTMF generator 70 is also connected to the cross-point matrix 50.

A telephony control 52, which is under the control of the input/output interface 64, controls the operation of the cross-point matrix 50, the microphone interface 42, the speaker interface 38, the hand set interface 34, the tone detection circuit 68, the DTMF generator 70, and the modem 44.

Figure 10:
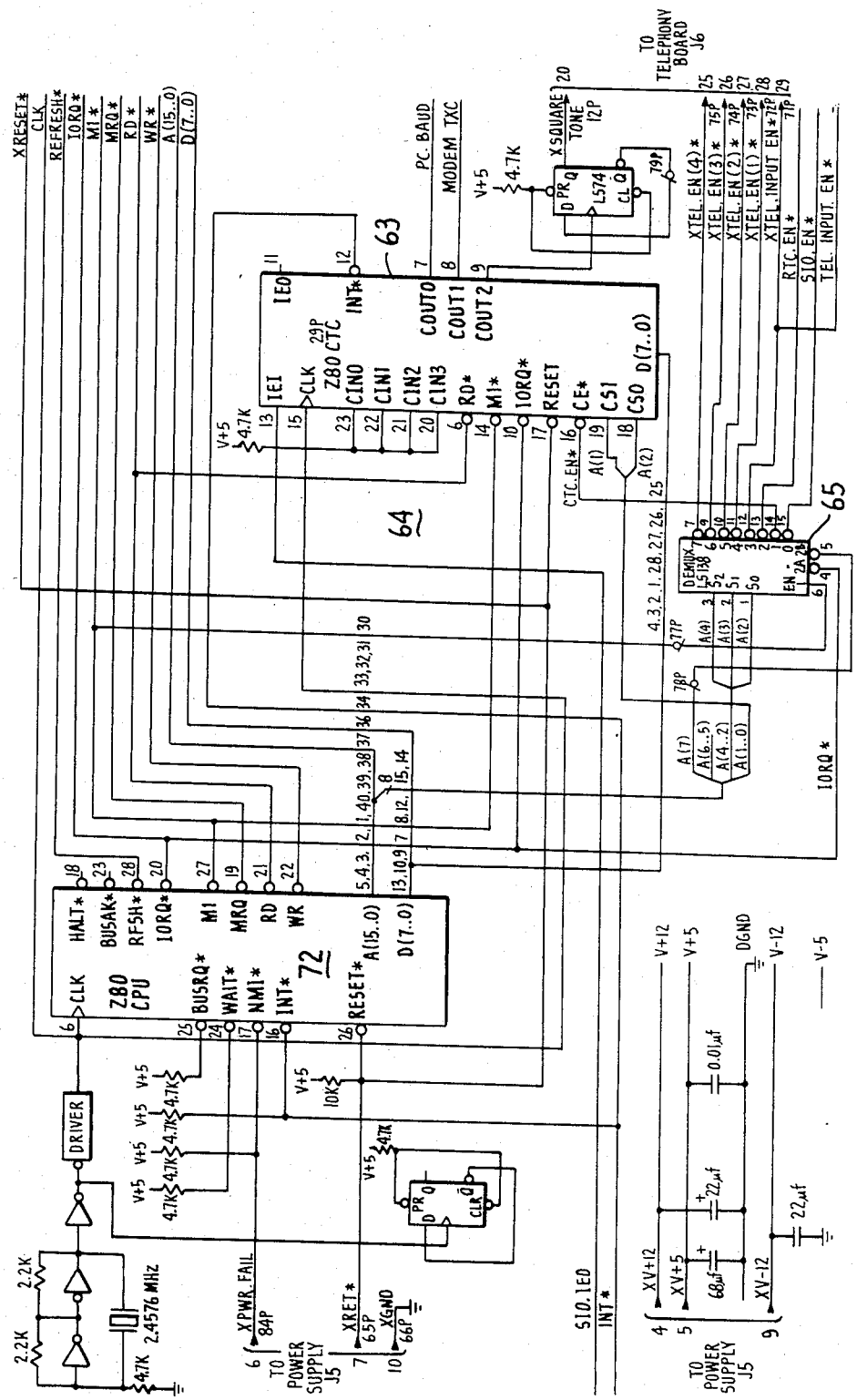
FIG. 10-12 and FIGS. 13a and 13b are circuit diagrams of portions of the apparatus of the present invention.
Figure 11:
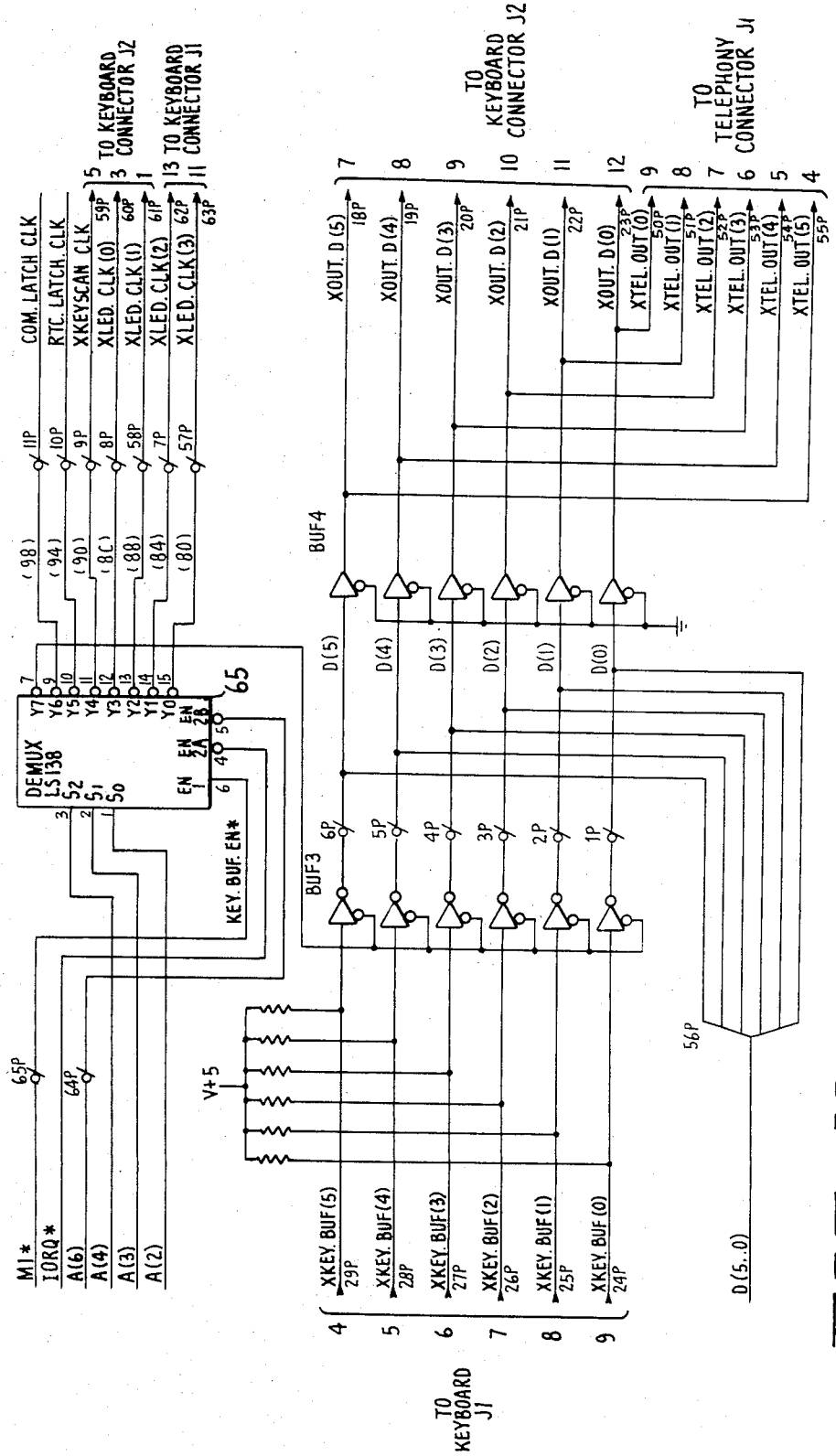

The input/output interface 64 is under the control of a CPU 72 and is shown in greater detail in part in FIG. 10. The interface 64 comprises a Z80 CTC 63 (from Zilog Corporation) and two LS 138 Demux 65 (shown in FIGS. 10 & 11). The Demux 65 is an LS 138 and is available from a number of sources, one of which is Texas Instruments. One Demux 65 serves to interface with the keyboard 86 (see FIG. 11), while the other interfaces with the telephony functions. The CPU 72 is a microprocessor Z-80 manufactured by Zilog Corporation, among others. The CPU 72 is connected to a ROM memory 74, a RAM memory 76 and a CMOS-type RAM memory 78. A counter timer and master clock 80 supplies clock pulses to the CPU 72 and to the input/output interface 64. A battery backup 82 is supplied to the CMOS RAM 78 and provides power for the memory 78 in the event of power failure. A real time clock 84 also supplies clock pulses to the input/output interface 64. The battery backup 82 also supplies power to the real time clock 84. A keyboard 86 and a plurality of lights (LED indicators) 88 are interfaced with the input/output interface 64. Finally, a power supply 90 supplies power to the necessary parts of the apparatus 10.

Figure 7:
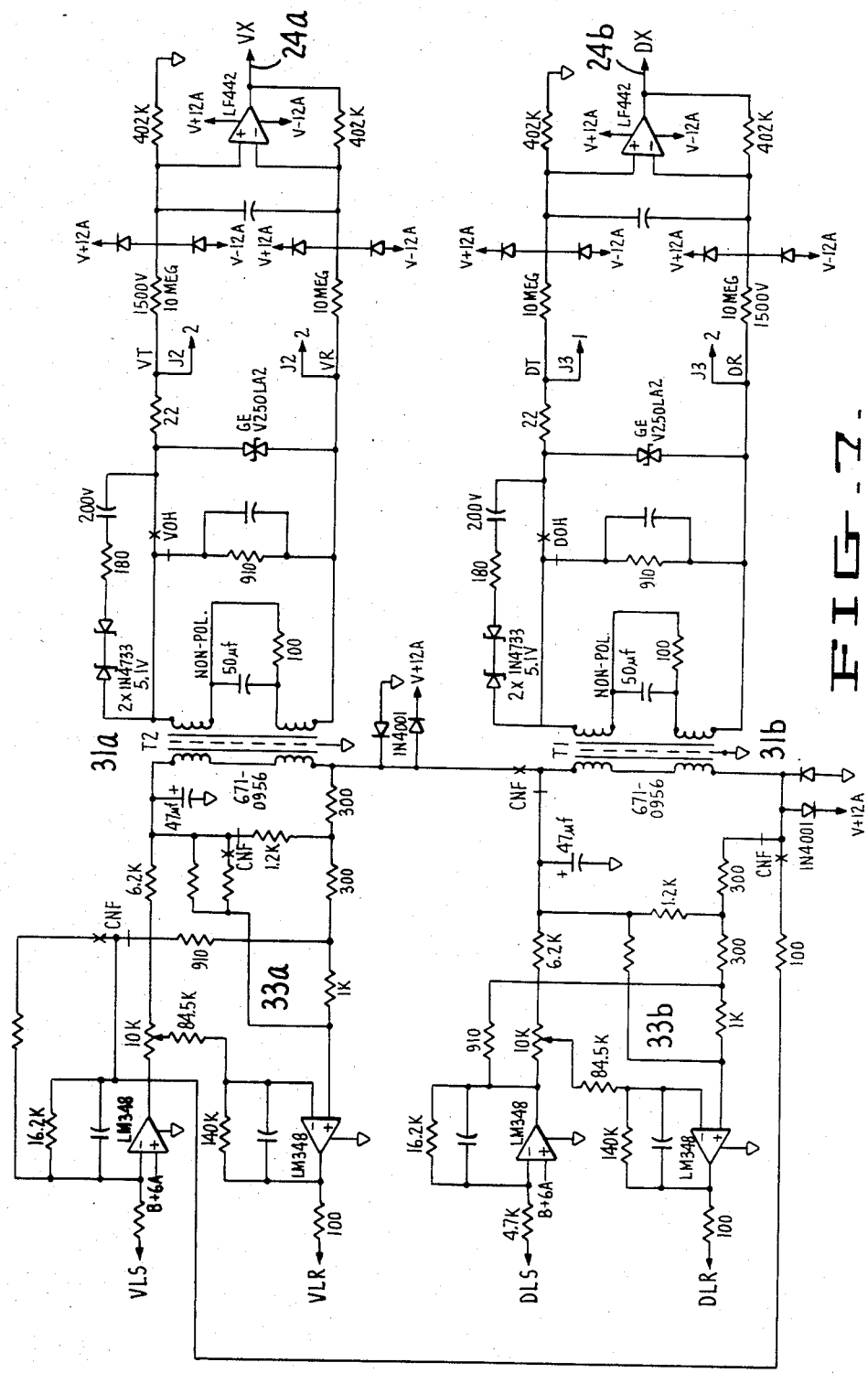
FIG. 7 is a detailed circuit diagram of a portion of the apparatus shown in FIG. 3.

Referring to FIG. 3, there is shown a block diagram, in a greater detail, of a portion of the apparatus 10, shown in FIG. 2. Telephone lines interface 30 is shown as comprising a line isolation transformer 31 and a 2W/4W converter 33. This is shown in greater detail in FIG. 7. The cross-point matrix 50 comprises three switches, manufactured by Motorola Corporation designated as MC 142100. The switches 50 switch the interconnection of the various components of the apparatus 10 to the telephone lines 24a and/or 24b. The microphone interface 42, the speaker interface 38, the hand set interface 34, are shown in greater detail, in FIG. 3. These comprise well-known standard parts and are well-known to those skilled in the art. The telephony control 52 comprises a plurality of digital voltage level shifters. As can be seen, the control to the cross-point matrix 50 comprises a level shifter from 5 volts to 15 volts. The signal from the input/output interface 64 of the CPU 72 is shifted to a higher voltage in order to control the cross-point matrix 50. Other level shifters switch the digital input/output interface 64 to the appropriate voltage level to control the hand set interface 34, speaker interface 38, speakerphone interface 42, etc.

The DTMF generator 70 is a component MK 5089 manufactured by Mostek. The tone detection circuit 68 is shown schematically in block diagram form and will be discussed in greater detail hereinafter.

The operation of the apparatus 10 of the present invention will now be discussed.

Transmitting and Receiving Analog Voice and Digital Data Signals in the Same Session The apparatus 10 of the present invention can be used alone. In the stand alone mode, the apparatus 10 is connected to the telephone lines 24a or 24b and the user uses the hand set 32 or the speaker 36 and the microphone 40 to communicate with another person. When the apparatus 10 is used in a stand-alone mode, it is like any other telephone device. The switches of the cross-point matrix 50 are set in a first position such that the hand set 32 or the speaker phone 38 and the microphone 40 are connected to the telephone line 24.

Alternatively, the apparatus 10 can be used with a computer system 20. However, even when the computer system 20 is connected via cable 22 to the RS232c connector 60 of the apparatus 10, both the apparatus 10 and the computer system 20 can operate independently of one another. The apparatus 10 can transmit and receive analog voice signals as in the stand-alone mode. The computer system 20 can operate as if the apparatus 10 were not connected. Both devices can operate simultaneously and independently.

As previously discussed, the apparatus 10 can be used with one telephone line 24 or with two telephone lines 24a and 24b. For the purpose of this discussion, we shall assume that there is only one telephone line 24. When the apparatus 10 is used to transmit and receive both analog voice signals and digital data signals in the same session, the switches in the cross-point matrix 50 are set to be switched between a first position and a second position. In the first position, the hand set 32 or the microphone 40 and speaker 36 are connected to communicate with the telephone line 24 as in the case of stand-alone operation. In the same first position, the modem 44 is connected by the cross-point matrix 50 to receive signals along the telephone line 24. In the second position, the hand set 32 and the microphone 40 and speaker 36 are disconnected from the telephone line 24 and the modem 44 is connected to transmit and to receive digital data signals to and from the telephone line 24. The switching of the cross-point matrix 50 is accomplished by the telephony control 52 which receives a signal from the CPU 72.

Normally, the cross-point matrix 50 switch is set in the first position, whereby analog voice signals can be transmitted and received to and from the telephone line 24. When the user desires to transmit digital data signals to the other party in the same session, the user presses one of the buttons along the keyboard 86 of the apparatus 10, or one of the keyboard buttons in the computer system 20 designated for transmission. One example of transmission of digital data signals is screen mail, i.e. the data displayed on the screen 26 of the computer is transmitted from one location to another. The CPU 72 receives the signal from the keyboard 86 or through the RS232C connector 60 and sends a signal to the input-/output interface 64 and to the telephony control 52 to switch the cross-point matrix 50 from the first position to the second position. The digital data signals from the computer system 20 are then converted into analog signals by the modem 44 and passed onto the telephone line 24.

The switching of the cross-point matrix 50 from the first position to the second position also occurs when the modem 44 receives a signal that the other party is ready to transmit digital data signals. In the transmission of digital data signals on a telephone line using modem devices, prior to the transmission of the digital data signal, the modem transmits a carrier signal. In fact, the digital data information subsequently transmitted is a modulation of the carrier signal, and is an analog signal. Thus, when the cross-point matrix 50 is in the first position, and the modem 44 is set to receive signals from the telephone line 24, when the modem 44 detects a carrier signal, the modem 44 alerts the CPU 72 through the modem interface 66 and the input/output 64 for the CPU 72 to switch the cross-point matrix 50 from the first position to the second position.

The CPU 72 automatically switches the cross-point matrix 50 from the second position to the first position when the apparatus 10 has terminated the transmission of digital data signals. In the apparatus 10 of the present invention, there is a certain protocol with regard to the transmission of digital data signal to the telephone line 24. This will be discussed in greater detail hereinafter. The CPU 72 has a priori knowledge of the type of protocol for the transmission of the message. Therefore, when the end of transmission is detected and after the digital data signals have been transmitted, the cross-point matrix 50 is switched back from the second position to the first position.

Alternatively, when the modem 44 no longer detects that data signals are received by the apparatus 10, the CPU 72 will then switch the cross-point matrix 50 from the second position to the first position.

It is thus seen that with the apparatus 10 of the present invention and with a computer system 20, digital data signals and analog voice signals can be transmitted to the same session to a single end user over a single telephone line 24.

If the apparatus 10 of the present invention were connected to two telephone lines, 24a and 24b, one line, e.g. 24a, can be used for voice communication, with the other line used for data communication. In such event, voice and data can be transmitted simultaneously to the same end-user. However, with two lines, teleconferencing, i.e., the transmission and reception of analog voice and digital data signals to and from a plurality of users can also be achieved. This is graphically illustrated in FIG. 5. In FIG. 5, party B has an apparatus 10, which is connected to two telephone lines; 24a and 24b. Parties A and C each has an apparatus 10 of the present invention, along with a computer system 20. Party B originates the call to party A over the phone line 24a. Party B then puts A on hold. Party B then originates the call to party C over the phone line 24b. Party B then puts parties A and C on conference call together. This is accomplished by the circuit shown in FIG. 7, and is wellknown to those skilled in the art. However, with the apparatus 10 of the present invention, in which analog voice and digital data signals can be transmitted in the same session, party B can transmit the same analog voice and digital information signals to parties A and C. Furthermore, if party A were to transmit analog voice and digital information signals to B, through the B telephone transfer, C would also receive the same analog voice and digital information signals. If both parties A and C have a computer system 20 having a display 26, the same digital data signals will appear on the display screen of all three parties, A, B, and C.

Supervisory Control

As previously stated, when the apparatus 10 of the present invention is connected to a telephone line 24 and is also connected to a computer system 20, the apparatus 10 can be used in the stand alone mode for telephonic communication along the telephone line 24. In addition, the computer system 20 can be operated as if the apparatus 10 of the present invention were not there. To the computer system 20, the apparatus 10 is merely another peripheral device. When the apparatus 10 is used conjunctively with the computer system 20 to transmit and receive analog voice signals and digital data signals in the same session, the apparatus 10, acts as a peripheral device, and send an interrupt along the cable 22 to the computer system 20. The interrupt signal causes the computer system 20 to cease its function and to service the interrupt request from the apparatus 10, such that the computer system 20 would then communicate with the modem 44 in the apparatus 10. In addition, the cross-point matrix 50 is switched to connect the modem 44 to the telephone line 24.

The computer system 20 must be programmed to service the interrupt request from the apparatus 10. One embodiment to accomplish this is shown graphically in FIG. 4. For example, if the computer system 20 were the IBM Personal Computer, it has the resident DOS or the resident operating system. The resident DOS occupies the highest level of importance or hierarchy in the memory. A computer program termed the "Real Time Co-System Executive" for handling interrupt requests from the apparatus 10 must first be loaded into the computer system 20. In FIG. 4, it is seen that, except for the resident DOS, the program has the highest priority for all applications software. Thus when the interrupt from the apparatus 10 is received by the computer system 20, it is given the highest priority possible. All of the controls of the computer system 20, except for DOS controls, are then under the program. In addition, the program has a portion of memory devoted to saving the information or data on the screen 26 which has been interrupted so that when control reverts back to the computer system 20 to the task on hand before the interruption, the system 20 can retrieve that interrupted operation and display the data on the display screen 26. In other words, computer system 20 will then be able to continue where it had left off prior to the interrupt from the apparatus 10. The portion of memory within the co-system program is designated graphically as 25. The memory 25 is sufficient for storing the data that is displayed on the screen when the operation of the computer 20 is interrupted by the apparatus 10.

Communication between the apparatus 10 and the computer system 20 is in accordance with the protocol shown in FIG. 6. Each packet of data is preceded by a header 92, which has, in part, information such as the command code and length of data. The header 92 is followed by the data 94 and is terminated by CRC (error checking section) 96.

Many functions can be performed ancillary to the transmission and reception of analog voice and digital data signals in the same session. For example, a directory of telephone lists stored within the computer system 20 can be displayed on the screen 26, when the apparatus 10 interrupts the operation of the computer system 20. The telephone directory can be displayed on the display screen 26 in order that the user can dial the correct number using the apparatus 10. Then, too, account time management, i.e., tracking the amount of time a call has taken, can be displayed on the display screen 26. Other functions such as calendar of events and terminal emulation can also be displayed. Finally, the apparatus 10, with the computer system 20, can be used for electronic mail. During off-peak rate hours, e.g. at night, digital data information can be transmitted from one location to another, received at the second location by the apparatus 10 and stored in the memory 76 of the apparatus 10 or in the memory or mass storage unit of the computer system 20. During the peak hours of telephone usage, e.g. in the morning, the user can retrieve the electronic mail sent during the night and display them on the display screen 26.

Changeable Rate of Transmission and Reception

As previously stated, the data signals transmitted and received by the apparatus 10 of the present invention, to and from a like apparatus 10, has a certain protocol. The protocol is in accordance with ANSI standard X 3.28 category D-1 subcategory 2.2, with header format X 3.57.

Figure 13A:
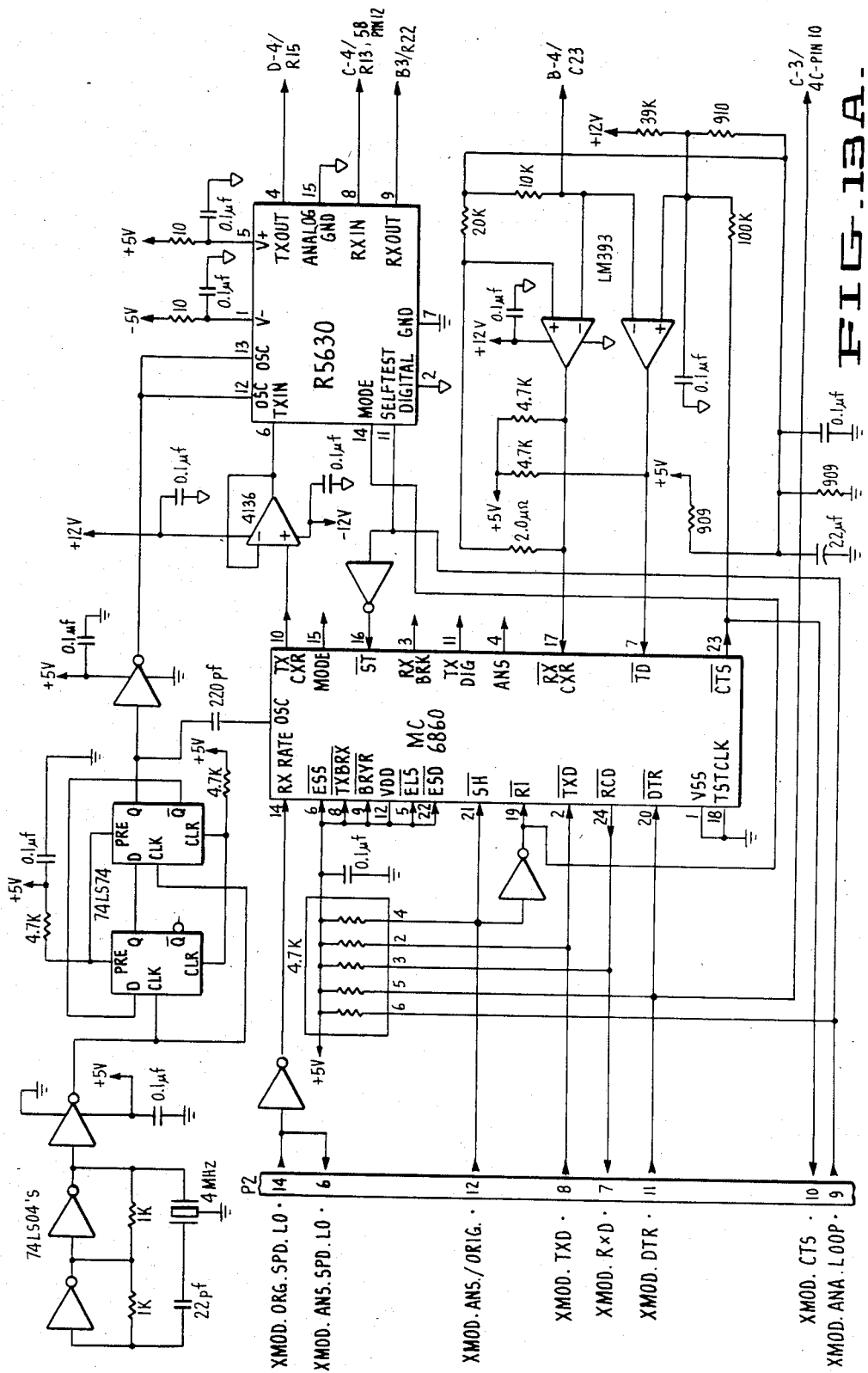
Figure 13B:
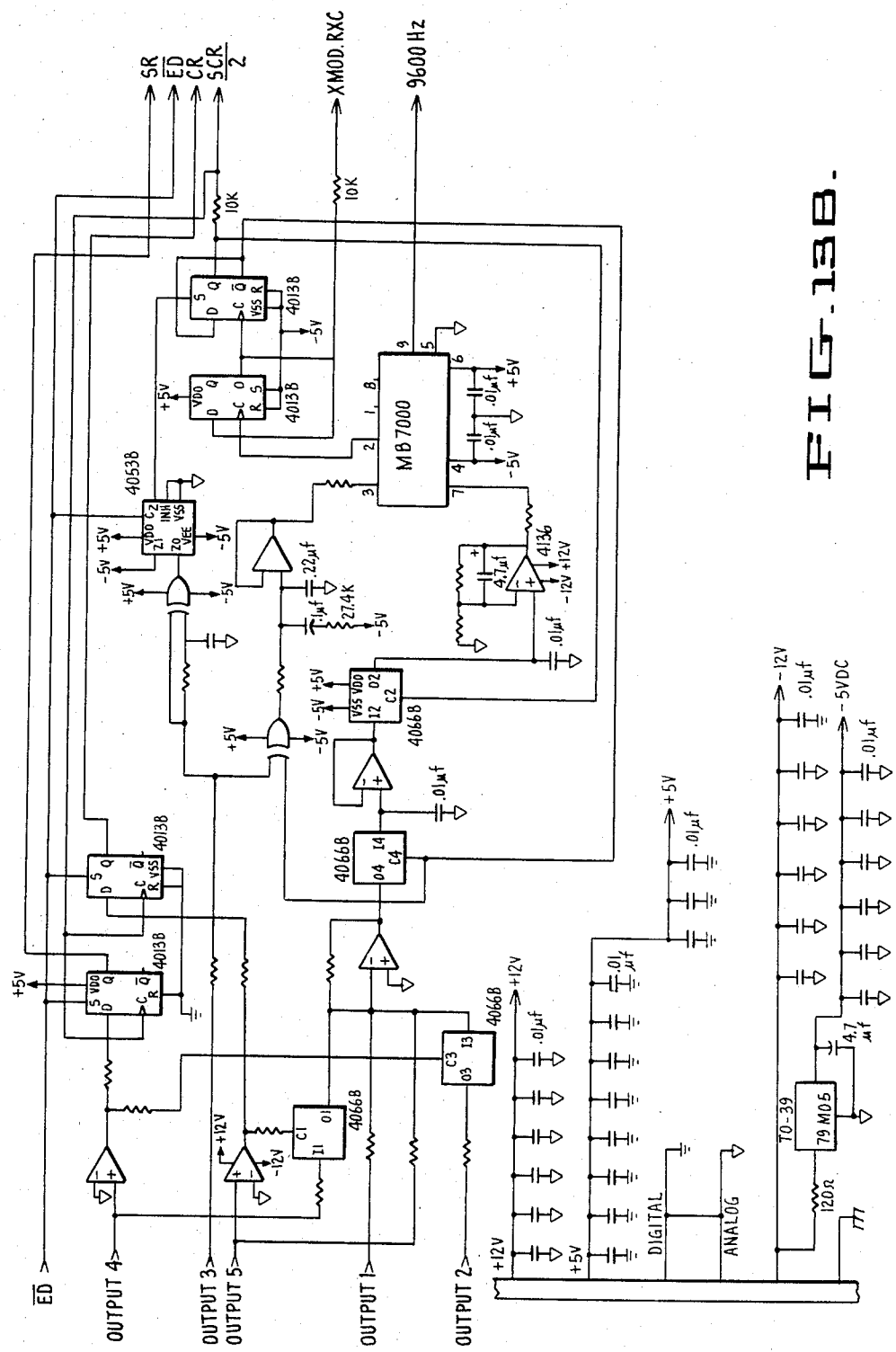

The modem 44 used in the apparatus 10 has a changeable rate of transmission and reception, and can be one of two types: Bell 103 type (shown in FIG. 13a) or Bell 212A type (shown in FIG. 13b). The Bell 103 type has a rate which can be changed from 600 baud to 450 baud, to 300 baud, to 110 baud. The Bell 212A type has a rate which can be changed from 1200 baud to 300 baud. The rate of transmission and reception of both types of the modem 44 can be changed on command from the CPU 72. When one apparatus 10 receives digital data information from the other apparatus 10, the amount of error in the data transmitted is checked. If the number of errors detected exceed a predetermined amount, the apparatus 10 receiving the digital data signal will then have its CPU 72 cause its modem 44 to change its rate of transmission and reception to a next lower rate. The CPU 72 then causes a signal to be sent to the other apparatus 10 instructing the modem 44 of the other apparatus 10 to lower the rate of transmission and reception of that modem to the same rate at which the receiving apparatus 10 had changed.

Initially when the apparatus 10 begins communication with another, a rate of 300 baud is selected. Thereafter the apparatus 10 determines what type of modem 44 is in the other apparatus 10. If the other apparatus 10 has the same type of modem 44, i.e. both are 103 or 212A type, then the apparatus 10 mutually increase their rate of communication until the highest speed is achieved (600 baud for 103; 1200 baud for 212A). If the two apparatuses 10 have different types of modem 44, the rate of communication is maintained at 300 baud—there being no other compatible rate.

If at the highest speed the messages are garbled, i.e. the number of errors detected is too many, then the modems 44 are instructed mutually to lower the speeds of transmission in order to compensate for the noise in the telephone line 24. The speed is lowered until the number of errors is reduced or eliminated.

Tone Detection Circuit

The tone detection circuit 68 is shown in block diagram form in FIG. 2 and in greater detail in FIG. 3.

Figure 8:
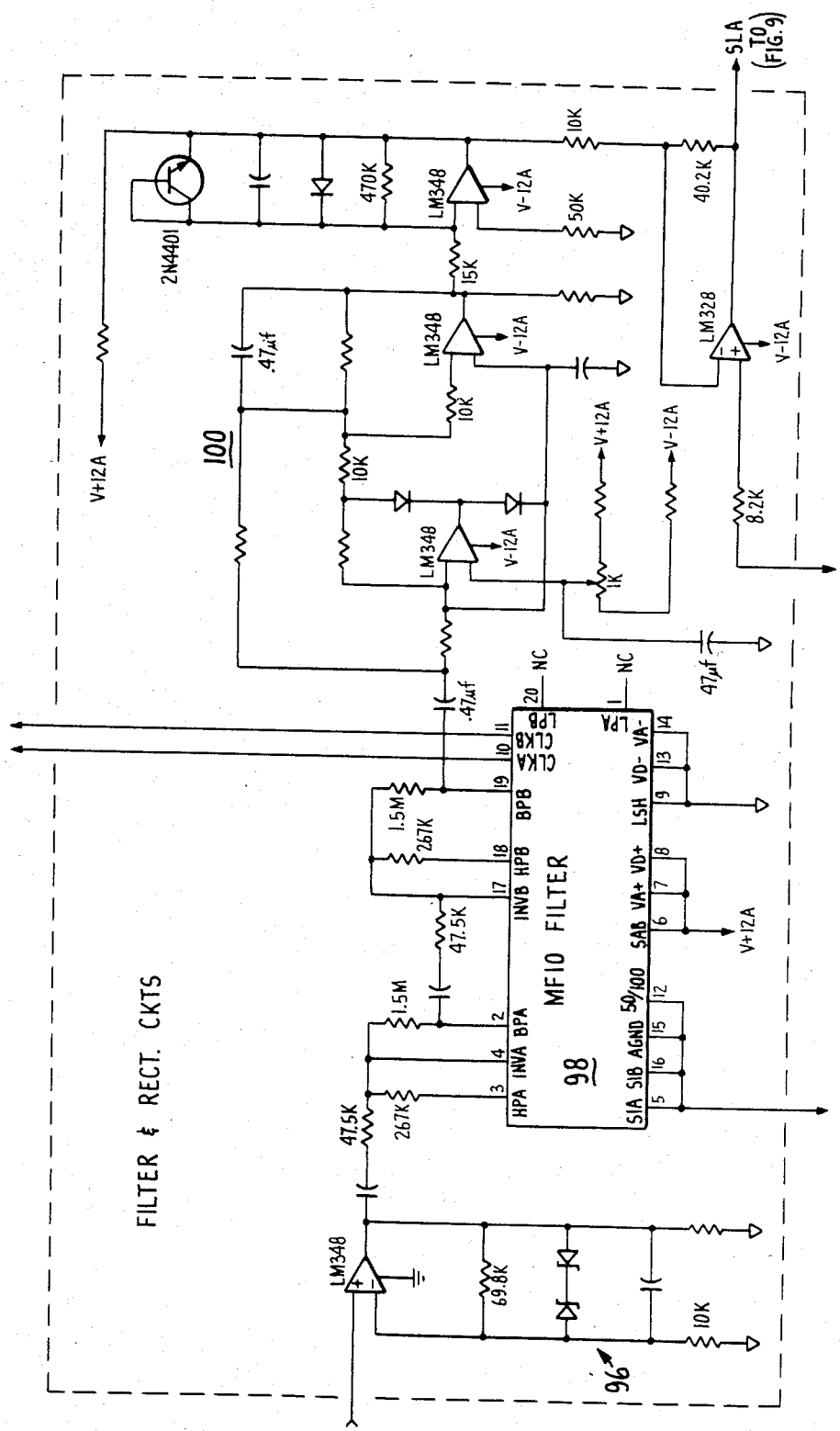
FIG. 8 is a circuit diagram of a portion of the tone detection circuit of the apparatus of the present invention.
Figure 9:
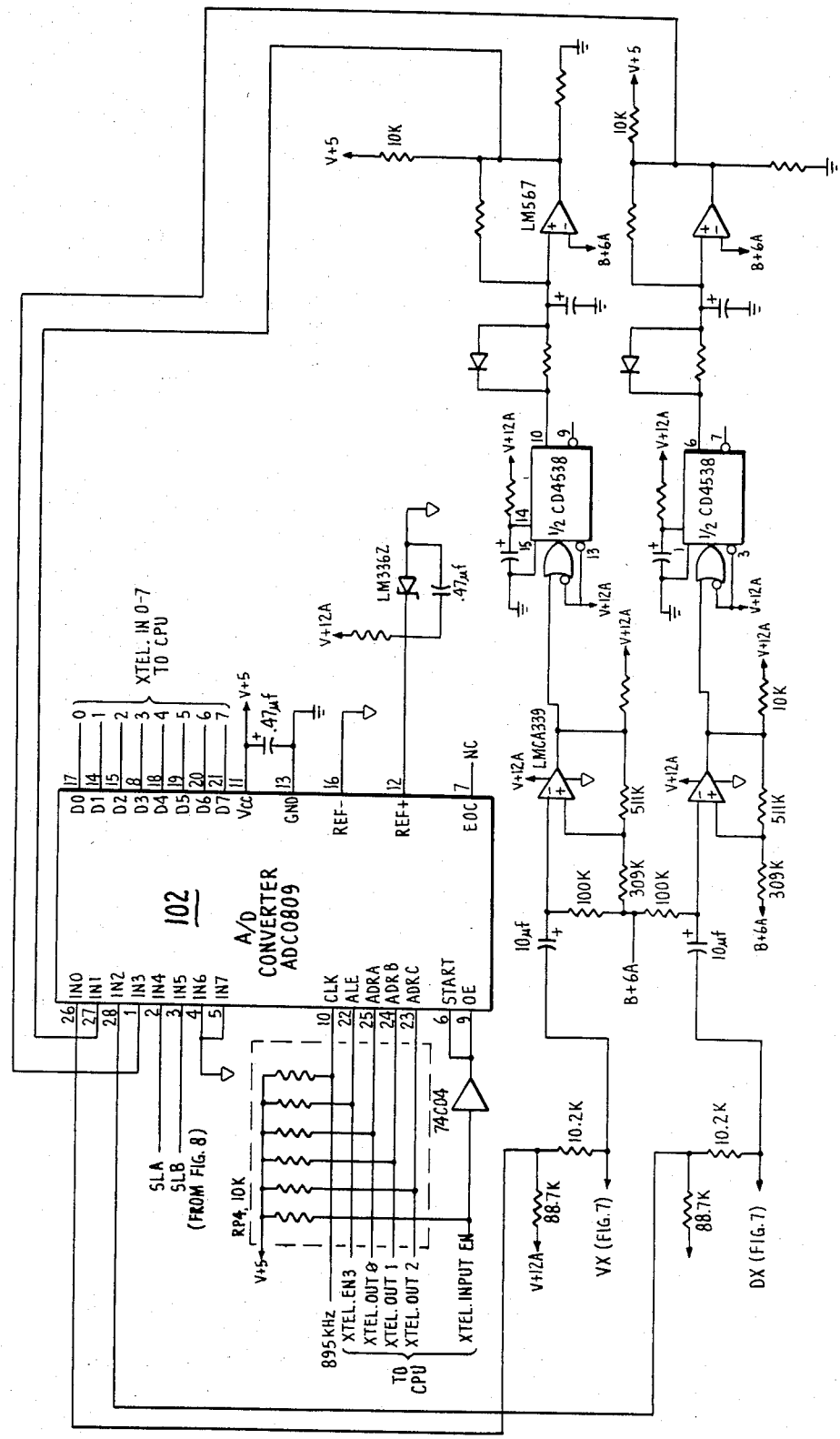
FIG. 9 is a circuit diagram of another portion of the tone detection circuit of the apparatus of the present invention.

The analog signal from the telephone line 24, after passing through the telephone line interface 30, is first passed through a dynamic range compressor. The dynamic range compressor is shown in greater detail in FIG. 8 and comprises a compressor circuit 96 and a bandpass filter 98. The compressed analog signal is then rectified by a rectifier 100. The dynamic range compressor reduces the amplitude and the bandwidth of the analog signal supplied to the rectifier 100. The rectifier 100 serves to produce an average signal. The average signal is then digitized by an A/D converter 102, as shown in FIG. 9. As shown in FIG. 3, the tone detection circuit 68 comprises a plurality of detectors such as VF (Voice Frequency) signal detector, a ringing detector, and a loop status detector. Each one of those detectors comprises a dynamic range compressor and a rectifier chosen to compress the particular amplitude range and to limit the bandwidth of the signal or signals of interest, i.e., to look for the ringing tone or the VF signal.

The plurality of detectors, as shown in FIG. 3 are then passed through an 8 input multiplexer. From the multiplexer, the signals are converted to a digital signal by the A/D converter 102. From the A/D converter 102, the digitized signals are then sent to the CPU 72. The CPU 72 receives the digital signal and processes the digital signal to determine the type of the signal, i.e., whether the signal is one of the various tone signals or is a voice signal.

Although the tone detection circuit 68 could have comprised an all digital circuit, i.e. convert the telephony signal directly to a digital signal and then using a microprocessor to discriminate the various tones, this would have required a dedicated microprocessor which would have resulted in considerable expense. By narrowing the bandwidth and averaging the signal before digitizing the signal, the amount of digital processing was reduced considerably. Furthermore, since the processing is digital, the discrimination is based upon a dynamic threshold. The CPU 72 detects the background energy level and uses that as the threshold to determine when a signal has exceeded the threshold. The duration of that excess is indicative of the type of tone signal.

With the tone detection circuit 68 of the present invention, the CPU 72 can sense when the various call status tones, or supervisory tones are generated on the telephone lines 24. In addition, since the call status tones can be discriminated, the tones can also be discriminated from the voice signals on the line. Of course, they are also distinguishable from the data signals on the line. Thus, in the operation of the apparatus 10 of the present invention, it is possible to place a call, and if the caller receives a busy tone, have the apparatus 10 of the present invention continually, i.e., periodically redial the last number and activate the hand set 32 or the speaker 36 only when the answering party answers the line or when the phone rings. In other words, with the apparatus 10 of the present invention, one can have the apparatus 10 automatically dial a number which was busy and perform its operations silently until the call has been answered or has rung. Then, the caller will be alerted to indicate that the call has been successfully placed.

Unattended Message Deposition

With the tone detection circuit 68, the CPU 72 of the apparatus 10 can be set to automatically "answer" a call, even if the user is not present. The number of rings after which the apparatus 10 will "answer" a call can be set by the user.

When a user of an apparatus 10 attempts to communicate with another user with a like apparatus 10, and finds that the other user is away. The user can then choose to automatically send a message such as "John called". Lengthy messages can also be transmitted and stored in memory 76 of the other apparatus 10 or in the memory or mass storage of the computer 20 connected thereto. When the other user returns, the message(s) can be retrieved.

If the other apparatus 10 has two telephone lines 24a and 24b, the message can be transmitted to the other apparatus 10 on one line while the other user is using the telephonic portion of the other apparatus 10 on the other line. Thus, messages can be automatically sent whether or not the apparatus 10 is in use or is attended by the user.

Labelling of Programmable Keys

The apparatus 10 has a keyboard 86 having a plurality of programmable keys 11 or switches. Each key can be programmed for a particular task. The software to permit the programming of each key 11 is well known.

However, in the apparatus 10 of the present invention, when it is desired to program a key 11, the physical layout of the keyboard 86 is displayed on the screen 26. The location of each key 11 is displayed on the screen 26. When a key 11 has been programmed, the title or the function of that key 11 can be displayed next to the display of the programmed key 11 on the screen 26. Thereafter, when a key 11 is used, the function or the label for that key 11 is displayed on the screen 26.

Therefore, with the apparatus 20, the function of the programmable key 11 as well as the label for that function can be changed electronically, facilitating alterations.

Figure 14:
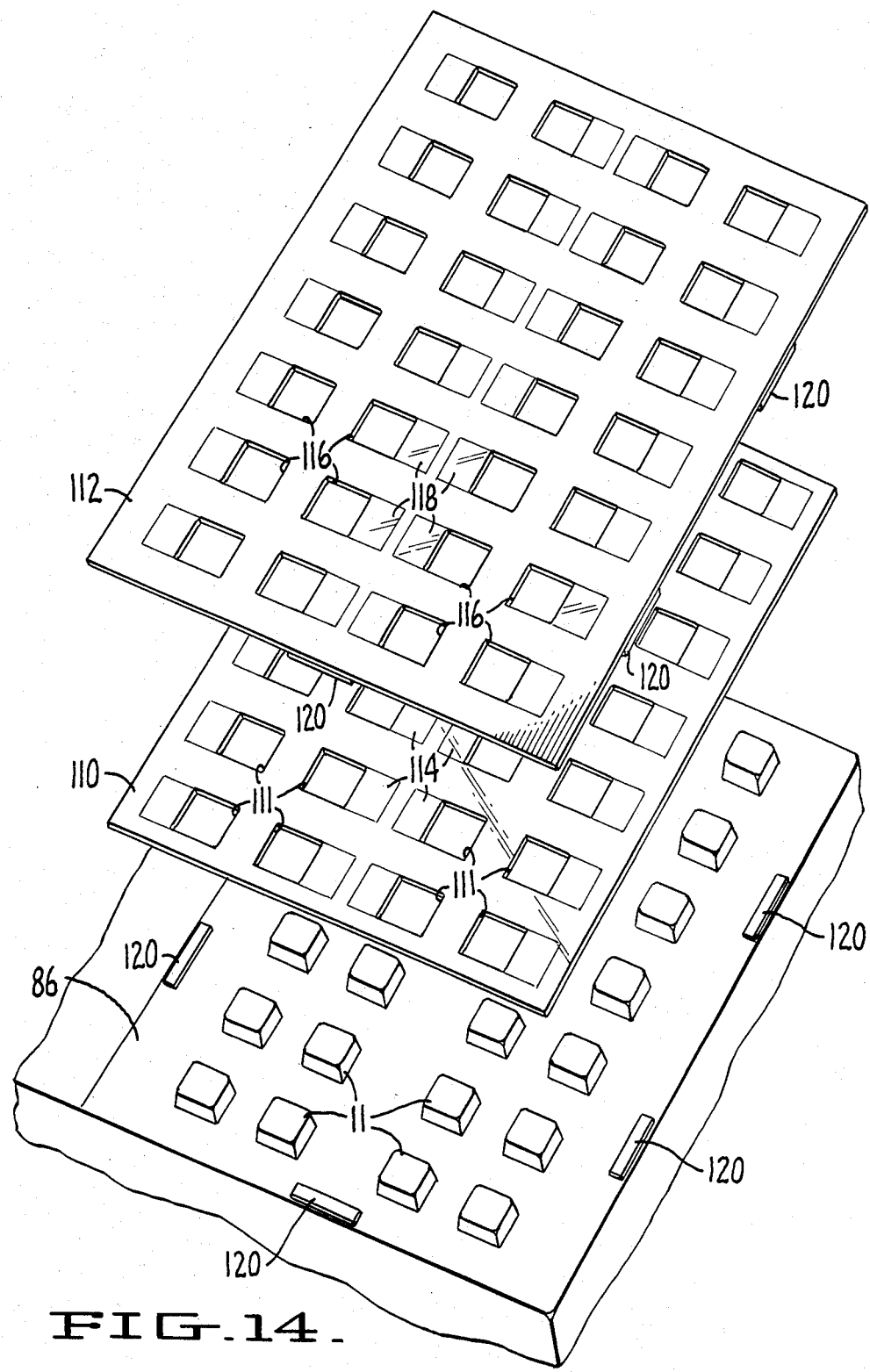
FIG. 14 is a partial perspective view of the keyboard portion of the apparatus of the present invention.

In the event a more permanent form of label is desired, the apparatus 10 is provided with such "permanent" labels. Referring to FIG. 14, there is shown a portion of the keyboard 86 with a plurality of programmable button switches or keys 11. A template 110 having a plurality of holes 112 is adapted to fit over the keys 11 and to be laid on the keyboard 86. In between each holes 112 is an area 114 of the template 110 where the label for the adjacent key 11 can be affixed. The template 110 is preferably of a thin, clear plastic material. A cover 112 covers the template 110 and is also laid onto the keyboard 86. The cover 112 also has a plurality of holes 116 which correspond to the location of the keys 11 and is adapted to be fitted over the keys 11 with the keys 11 passing through the holes 116. The cover 112 is preferably made out of an opaque plastic material. The cover 112 has a plurality of areas 118 which are clear and correspond to the label areas 114 on the template 110. Thus, the labels affixed on the template 110 are visible through the cover 112.

The cover 112 is attached to the keyboard 86 by reusable fastening means 120. Preferably, the cover 112 is attached to the keyboard 86 by Velcro (a registered trademark) material 120. One portion of the material 120 is on the cover 112 while the other portion is on the keyboard 86. The materials 120 adhere to one another when pressed together and release when separated. Thus, the cover 112 can be removed and the label on the template 110 changed when desired.

There are many advantages to the apparatus 10 of the present invention. First and foremost is that it is a stand-alone telephonic apparatus which can be used with a computer system 20, such that analog voice and digital data signals can be transmitted to and received from one or more answering parties in the same session. Furthermore, with like apparatus, the apparatuses can communicate with one another in the transmission or reception of digital data signals, at the highest rate without incurring unacceptable error. Finally, a novel signal detection circuit is disclosed wherein various types of tones and voice can be discriminated from one another.

We claim:

1. A communication apparatus for transmitting and receiving analog voice signals, digital data signals, and data carrier signals that precede and follow the digital data signals to and from a communication medium, in the same session, said apparatus comprising:

telephony means for transmitting and receiving said voice signals to and from said medium;

modem means for transmitting and receiving said data signals to and from said medium;

switch means interposed between said communication medium, said telephony means, and said modem means; said switch means are adapted to connect said medium and said telephony means and said modem means in a first position and in a second position, wherein in said first position said telephony means are connected to transmit and to receive voice signals to and from said medium and said modem means are connected to receive data carrier signals from said medium; and wherein in said second position said telephony means are disconnected from said medium and said modem means are connected to transmit and to receive digital data signals to and from said medium; and control means for controlling said switch means between said first position and said second position; said control means for automatically switching said switch means from said first position to said second position when said apparatus transmits data signals to said medium or when said modem means detects said data carrier signals; and said control means for automatically switching said switch means from said second position to said first position when said apparatus terminates the transmission of digital data signal to said medium or when said modem means ceases to receive data signals from said medium;

whereby said data signal and voice signal are transmitted and received to and from said communication medium in the same session.

2. The apparatus of claim 1 wherein said signals are carried by said medium to a single end-user.

3. The apparatus of claim 1 wherein said signals are carried by said medium to a plurality of end-users.

4. The apparatus of claim 3 further comprising hold means for holding the communication session between said apparatus and a first end-user;

means for originating a communication session between said apparatus and a second end-user; and means for connecting together said session with said first end-user and said session with said second end-user.

* * * * *